United States Patent

[11] 3,573,478

[72] Inventor Kenneth J. Stempler
 Bronxville, N.Y.
[21] Appl. No. 801,628
[22] Filed Feb. 24, 1969
[45] Patented Apr. 6, 1971
[73] Assignee The United States of America, as
 represented by the Secretary of the Air
 Force.

[54] OPTICAL SECTOR SWITCH APPARATUS FOR INDICATING DEGREE OF ANGULAR MOVEMENT BETWEEN TWO MOVABLE SURFACES
 9 Claims, 3 Drawing Figs.
[52] U.S. Cl. .................................................... 250/239,
 250/211
[51] Int. Cl. ..................................................... H01j 39/12
[50] Field of Search .......................................... 250/239;
 317/235/27, (Inquired)

[56] References Cited
UNITED STATES PATENTS
3,161,777  12/1964  Farmer .......................  250/239
3,413,480  11/1968  Biard et al. .................  250/211

Primary Examiner—Roy Lake
Assistant Examiner—V. Lafranchi
Attorneys—Harry A. Herbert, Jr. and George Fine ABSTRACT: An apparatus for indicating the degree of angular movement between two relatively moveable surfaces is provided and is comprised of an infrared radiation emitter and an infrared radiation sensor, both mounted to one of the moveable surfaces, and a reflective surface of predetermined extent mounted to the other moveable surface. Both emitter and sensor are solid state devices. The emitter and sensor are placed such that their geometrical axes approximately coincide at the reflector surface to reflect the emitted radiation back toward the sensor to activate indicating circuitry associated with the sensor to indicate the position of the moveable surfaces with respect to each other. When the reflector is not positioned such that it receives radiation from the emitter, the indicating circuitry will not be activated.

Patented April 6, 1971

INVENTOR.
KENNETH J. STEMPLER
BY Harry C. Herbert, Jr.
   and
   George Line
   ATTORNEYS Patented April 6, 1971
3,573,478
2 Sheets-Sheet 2
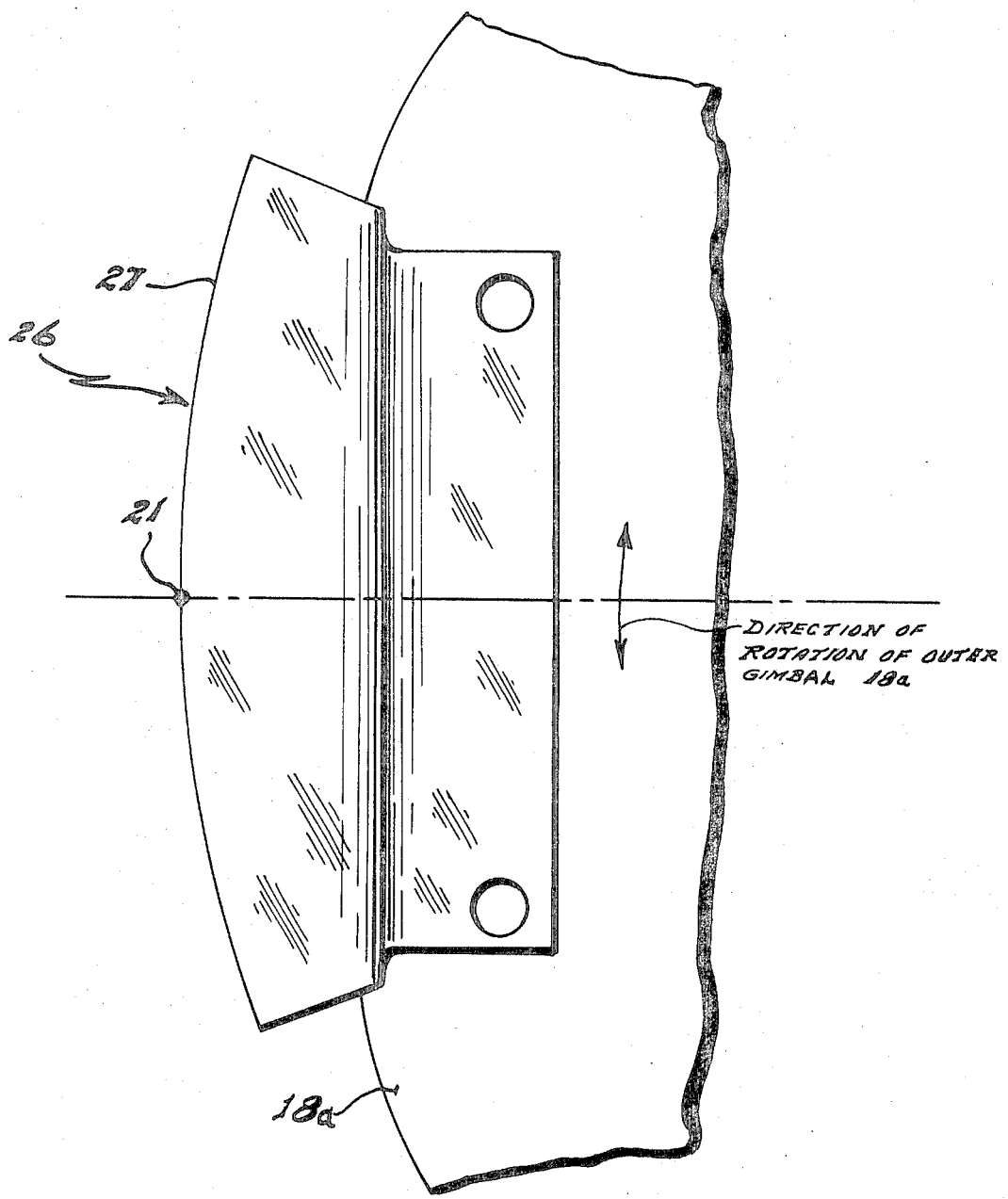
FIG.1-A
INVENTOR.
KENNETH J. STEMPLER
BY Harry A. Herbert Jr.
George Fine and
ATTORNEYS

OPTICAL SECTOR SWITCH APPARATUS FOR INDICATING DEGREE OF ANGULAR MOVEMENT BETWEEN TWO MOVABLE SURFACES

BACKGROUND OF THE INVENTION

The present invention relates broadly to optical sector switch apparatus and, more particularly, to apparatus for providing an on-off or go-no go signal between relatively movable surfaces within a predetermined angular range or sector.

In applications involving relatively movable members or surfaces such as in an inertial platform, it is often desirable to provide means for indicating whether or not the members are within or without a given range of position with respect to each other.

An inertial platform is comprised of an inner axis, generally called the azimuth axis on which is mounted the operational components of the platform such as the gyroscope and accelerometers, the combination of components and its mounting apparatus being called the azimuth gimbal. Surrounding the azimuth gimbal is a plurality of additional gimbals designed to rotate as the platform is reoriented in space to keep the spin axis of the gyro parallel to a given reference axis. Often, it is desirable to provide an indication of whether or not a given gimbal is within a given positional range with respect to one of its adjacent gimbals.

Prior methods for indicating whether or not a given gimbal is within a given positional range with respect to one of its adjacent gimbals have been the cam and microswitch, capacitive probe, and slip ring and brush block.

The platform gimbal system is mechanical and interconnected by means of bearings which generated friction torque and electronic equipment such as slip ring and brush block assemblies which generate further friction torque, all of which adversely affect platform performance, generally by increasing the gyro drift rate. The cam and microswitch are mounted such that the cam is on one gimbal and the microswitch on the other and they require moving frictional contact in order to indicate position. This generates undesirable friction torques. The slip ring and brush block assembly also produce significant undesirable friction torque. Further, the slip ring and brush block utilizable in an inertial platform must necessarily be small, of the order of ¼ inch diameter or less. This means that the slip ring circumference is 0.7850 inch which corresponds to 0.0025 inch per degree of rotation. When coupled with a brush block contact of any appreciable size, accurately a cut off at a particular angle becomes very difficult even under the best of conditions. Further, initial accurate assembly of the brush block contact relative to the slip ring into the platform is extremely difficult.

The capacitive prove requires high frequency excitation and a large plate area in order to achieve sufficient distance between the plates to prevent shorting in any application where vibration is present, which is invariably the case in inertial platforms. Practically, the large plate area required to achieve even one mil separation between plates is prohibitive in an inertial platform where available space is at a premium.

SUMMARY OF THE INVENTION

In accordance with the present invention, an optical assembly comprising a radiation emitter and a sensor are mounted on one gimbal and a reflective surface mounted on the next adjacent gimbal to reflect emitted radiation to the sensor to activate it. It makes no difference to which gimbal the sensor and emitter are mounted and to which gimbal the reflector is mounted as long as they are adjacent gimbals. For ease of understanding, it will be assumed that the emitter and sensor are mounted to any gimbal and that the reflective surface is mounted to the inner adjacent gimbal to which the outer gimbal, i.e., the gimbal to which the sensor and emitter are mounted, appears stationary.

The emitter and sensor are angled towards each other such that the device axes intersect each other approximately at the reflective surface. The reflective surface is of a predetermined angular extent and is preferably a gold-plated metal sector which is reflective to the emitted wave length and is mounted to the inner gimbal. The emitter, preferably a semiconductor, preferably has an emitting surface of gallium arsenide which emits infrared radiation toward the reflective surface which, when the reflector rotates into position to receive this radiation, reflects it back towards the sensor to activate it and complete an external indicating circuit. The sensor, preferably a silicon photosensitive semiconductor having collector and emitter terminals connected to the external indicating circuit, has its internal resistance to current flow driven downwardly by received infrared radiation which completes the external circuit. The infrared radiation acts as a base drive to activate the sensor.

The gallium arsenide emitter emits radiation at wavelengths between 0.88 and 0.94 angstroms, which is in the near infrared spectrum. The silicon sensor is capable of receiving radiation wavelengths of between about 0.8 and 1.5 angstroms. The receptivity of the sensor to only the 0.8—1.5 angstrom wavelength range eliminates the problem of sensor activation by stray light or heat, both of which have radiation wavelengths outside the sensitivity range of the sensor.

In applications requiring measurement accuracy, it is critical that the device axes intersect approximately at the reflective surface. If this were not the case, the sensor would see a point not coincident with the point where the emitter axis intersects the reflective surface which would effectively shift the indication range by making it appear as though the reflective surface had been shifted to one side and fore shortened.

To avoid this problem, it is preferred that the reflective surface be mounted such that it always requires shims between it and the gimbal whereby manufacturing tolerances in the spacing between gimbals are removed during manufacture. One way in which to determine the proper amount of shimming is to operate the emitter and place the reflective surface in position to reflect radiation back towards the sensor to activate the indicating circuit and then measuring current flow through, or voltage drop across, a load resistor. Since current flow through the load resistor is a function of the resistance of the sensor, shimming the reflective surface to achieve maximum current flow achieves a positive method for determing that the device axes intersect each other approximately at the reflective surface.

Most emitters do not emit radiation in a parallel pattern but in an expanding cone pattern with radiant power dropping off as a function of the square of the distance the radiation travels between emitter and sensor (effective distance). Also, most emitters output over 95 percent of their power into a 180° cone with generally about 90 percent contained within about a 90° cone. As most silicon sensors are power activated devices, it is preferred to keep the effective distance between emitter and sensor as small as possible, preferably between about 0.010 inch and 0.050 inch, since the less the effective distance is, the more power the sensor will receive for activation. However, the sensor will generally see only a portion of the reflected cone and, if the device axes do not intersect at the reflective surface, the sensor will be "seeing" a portion of the reflected cone to one side of the emitter axis, thereby giving an inaccurate position indication as discussed above.

Devices other than gallium arsenide emitters and silicon sensors may be used, as may an ordinary light source and sensor receptive to the visible spectrum.

An alternate method of construction may be used whereby the emitter and sensor are mounted such that they face each other a small gap between them. They are both mounted on the same fixed reference gimbal. An opaque sector is mounted on the rotatable gimbal and passes between the devices. When the opaque sector is between the devices, radiation reception by the sensor is cut off and the sensor appears open. With the sector not blocking the devices, the sensor will conduct.

Referring now to the drawings in which a preferred embodiment of the invention is described and where like numerals refer to like parts:

DESCRIPTION OF THE DRAWINGS

FIG. 1A is a left side view of the reflector; and

DESCRIPTION OF THE PREFERRED EMBODIMENT

Figure 1:
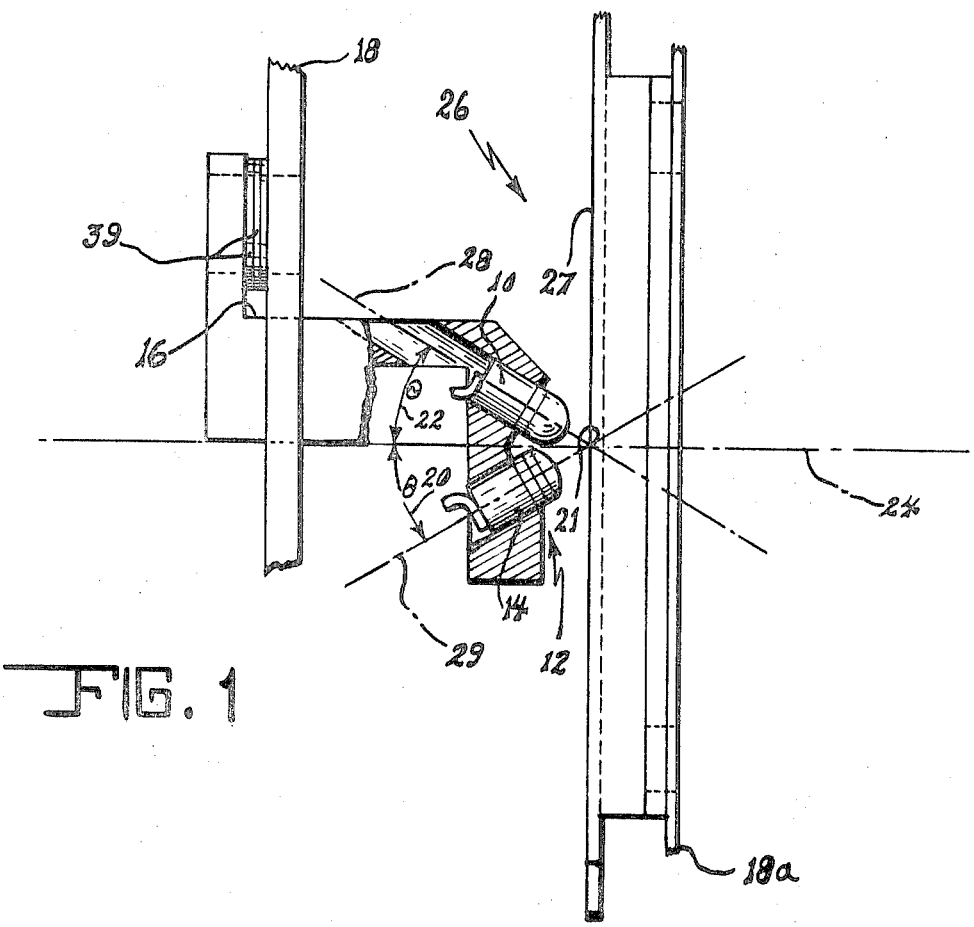
FIG. 1 is a side view, partially in section, of the optical switch in accordance with this invention.

Referring now to FIG. 1, the optical sector switch apparatus is comprised of an infrared solid state emitter 10 having maximum frequency transmission characteristics in the 0.88 to 0.94 wavelength range and a solid state transistor receiver 12, mounted in a housing 16. The infrared emitter 10 has an internal emitting surface, preferably of gallium arsenide, and the solid state transistor receiver 12, which includes silicon sensor 14, are mounted at predetermined angles in the housing 16 and the housing 16 is mounted on an outer gimbal 18 in an inertial platform. Conventional power supply means are utilized to supply appropriate power to infrared emitter 10. The infrared emitter 10 and the silicon sensor 14 are mounted at angles 20, 22 which are 30° off the reference line 24 normal to a reflector which is shown in the preferred embodiment. However, the angles need not be equal nor are they limited to 30°, but may be any angle greater than 0° and less than about 80°. However, angles below 30° require large power outputs from the emitter, generally of the order of 300 microwatts to achieve a practical commercial unit. A reflector 26 is mounted on an inner gimbal member 18a whose motion will operate an external electronic circuit (to be described) and is mounted such that the intersection 21 of the optical axes 28, 29 of the devices coincides with the reflector surface 27. The plane of the reflector 26 is parallel to the horizontal line through the housing 16 and the distance from the foremost tip of the emitter 10 to the reflective surface 27 is 0.030 inch. This can, however, be increased up to 0.50 inch provided that there is sufficient power emitted to activate the sensor at that distance. At 0.030 inch distance, only about 100—150 microwatts power is needed while at 0.50 inch, about 300—500 microwatts is needed to activate currently available silicon sensors.

The housing 16 in which the infrared emitter 10 and the silicon sensor 14 are mounted is considered stationary with respect to the inner gimbal 18a which is moveable with respect to outer gimbal 18 and on which the reflector 26 is mounted, and provides an angular measurement reference point for the reflector 26. The reflector 26 is a 40° arc (shown in FIG. 1A) whose surface, if continued for a full 360°, would always intersect the point of convergence of the emitter and sensor axes 28, 29. As the moveable member moves with respect to the housing 16, the reflector 26 is moved either into or out of intersection with the device axes 28, 29. When the reflecting surface 27 is intersected by the device axes 28, 29, the reflector reflects radiation back toward sensor 14 to activate it. When the reflecting surface 27 is moved out of intersection with the device axes, the sensor becomes unactivated as will be more fully described below. Hereinafter emitter 10 and sensor 14 will be referred to as the devices. Any arc angle may be used above or below 40° depending on the angular range to be indicated.

Figure 2:
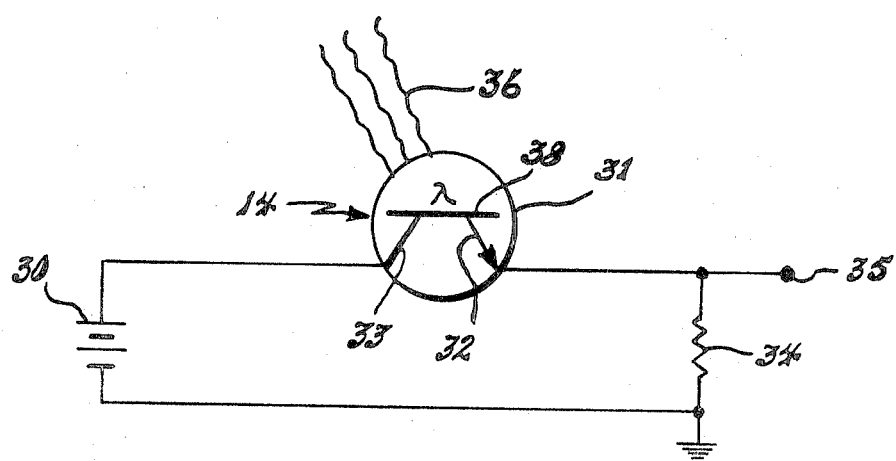
FIG. 2 is a schematic diagram utilizing the silicon sensor unit in an electrical circuit to provide an on/off signal.

The devices are always in the on position. The emitter 10 sends out electromagnetic rays which are directed to the reflecting surface 27. The reflecting surface 27, in turn, reflects the radiation toward the sensor 14 which is a transistor with a voltage impressed conventionally across the collector and emitter junctions. FIG. 2 illustrates the use of the silicon sensor 14 in a typical electronic circuit. The power supply voltage 30 which is impressed across the emitter 32 and the collector 33 of transistor 31 is 35 volts. A 10,000 ohm load resistor 34 is provided between the emitter 32 and ground. The radiation acts as the base drive, causing the transistor 31 to conduct. The output on/off or go/no-go signal appears at output 35 of the circuit which is the junction of the emitter 32 and load resistor 34. Only 5 volts is needed to drive the sensor, the additional voltage being needed to provide a voltage drop across the load resistor. Any voltage above 5 volts may be used, the specific voltage limited only by the desired voltage drop across load resistor 34 during the time when the sensor 14 is conducting.

When inner gimbal 18a moves the reflector 26 to a position where no radiation 36 from the emitter 10 strikes its surface 27, the base drive is effectively removed from the silicon sensor 14 which now appears as an open circuit. Emitter 10 emits radiation into an expanding cone (not shown) which is reflected back toward sensor 14.

The closer the two devices are to the reflective surface 27, the smaller the cone angle the sensor will see. If the device axes do not intersect at reflective surface 27, then the sensor 14 will appear to move toward one side of the output pattern of the emitter 10. This means that sensor output will be lower than desired and the point on the reflector 26 that the sensor 14 "sees" will not be that of the original intersection 21 of the device axes, but some point offset to either side of it.

To accurately locate the point of intersection of the axes 28, 29 on the reflective surface 27, the housing 16 is designed so that it always requires one or more shims 39 between it and outer gimbal 18 with the control dimension being that from the reflective surface 27 to the housing after shimming. This dimension is ascertained by operating the emitter and sensor external circuit and shimming the housing until a maximum output at 35 is obtained at which point the axes 28, 29 intersect approximately at the reflector surface. However, the control dimension may also be mechanically measured as by a vernier scale to determine the proper amount of shimming required.

Although the invention has been described with reference to a particular embodiment, it will be understood to those skilled in the art that the invention is capable of a variety of alternate embodiments within the spirit and scope of the appended claims.

I claim:

1. An optical sector switch apparatus for automatically providing an on/off signal over a predetermined angular range between relatively moveable surfaces comprising: an emitter for emitting electromagnetic radiation, a sensor for receiving said radiation, and a reflector, said emitter and sensor being positioned at fixed predetermined angles relative to each other and to a reference line normal to the reflector, said fixed predetermined angles being greater than 0° and less than approximately 80°, said emitter and sensor being positioned so that emitted radiation from said emitter is received by said sensor over said predetermined angular range, a means for interrupting the reception of radiation by said sensor.

2. An optical sector switch apparatus as in claim 1 wherein said emitter and sensor are both mounted to the same surface, said emitter and sensor each having an axis, said axes forming an intersection in front of said devices; said reflector having a reflective surface to reflect said radiation, said reflector being mounted to the other said moveable surface; means for varying the distance between the emitter and sensor combination and said reflector such that said axes intersect approximately at said reflective surface whereby when said reflector is reflecting radiation, said sensor is activated and when said reflector is not reflecting radiation, said sensor remains inactivated.

3. An optical sector switch apparatus as in claim 1 wherein said emitter and sensor are mounted in a housing, said housing being mounted to one of said surfaces, wherein said means for varying the distance between said emitter and sensor combination and said reflector comprises a plurality of shims inserted between said housing and the surface to which the housing is mounted.

4. An optical sector switch apparatus as in claim 1 wherein said emitter is a gallium arsenide semiconductor.

5. An optical sector switch apparatus as in claim 1 wherein said sensor is a silicon semiconductor device.

6. An optical sector switch apparatus as in claim 1 wherein said electromagnetic radiation is in the infrared frequency spectrum.

7. An optical sector switch apparatus as in claim 2 wherein said predetermined angles are 30°.

8. An optical sector switch apparatus as in claim 6 wherein said emitter has maximum radiation output in the 0.88 to 0.94 angstrom wavelength range.

9. An optical sector switch comprising an emitter, a sensor, and a reflector, said emitter and sensor being mounted in a housing and at predetermined angles to each other and to a reference line in said housing normal to said reflector said housing being mounted to a first surface, said reflector having a reflecting surface and being mounted to a second surface, said first and second surfaces being relatively moveable to each other, said emitter and sensor both having axes which intersect each other at predetermined point in front of said housing, said sensor being electrically connected to an indicating circuit external of said housing.